United States Patent [19]

Duggal et al.

[11] Patent Number: 5,614,881

[45] Date of Patent: Mar. 25, 1997

[54] CURRENT LIMITING DEVICE

[75] Inventors: Anil R. Duggal; Lionel M. Levinson, both of Niskayuna; Harold J. Patchen, Burnt Hills; Larry N. Lewis, Scotia, all of N.Y.

[73] Assignee: General Electric Company, Schenectady, N.Y.

[21] Appl. No.: 514,076

[22] Filed: Aug. 11, 1995

[51] Int. Cl.$^6$ ........................................... H01C 7/10
[52] U.S. Cl. ........................ 338/22 R; 338/20; 338/21; 338/225 D
[58] Field of Search ................................ 338/21, 22 R, 338/22 SD, 20; 361/126, 135

[56] References Cited

U.S. PATENT DOCUMENTS

| | | | |
|---|---|---|---|
| 3,226,600 | 12/1965 | Zielasek | 315/209 R |
| 3,243,753 | 3/1966 | Kohler | 338/31 |
| 3,673,121 | 6/1972 | Meyer | 252/511 |
| 4,017,715 | 4/1977 | Whitney et al. | 8/22 |
| 4,101,862 | 7/1978 | Takagi et al. | 338/23 |
| 4,304,987 | 12/1981 | Konynenburg | 219/553 |
| 4,317,027 | 2/1982 | Middleman et al. | 338/22 R |
| 4,746,896 | 5/1988 | Mcquaid et al. | 338/314 |
| 4,890,186 | 12/1989 | Matsubara et al. | 361/103 |
| 5,057,674 | 10/1991 | Smith-Johannsen | 219/553 |
| 5,068,634 | 11/1991 | Shrier | 338/21 |
| 5,166,658 | 11/1992 | Fang et al. | 338/23 |
| 5,247,276 | 9/1993 | Yamazaki | 338/22 R |
| 5,260,848 | 11/1993 | Childers | 361/127 |
| 5,313,184 | 5/1994 | Greuter et al. | |
| 5,382,938 | 1/1995 | Hansson et al. | 338/22 R |
| 5,414,403 | 5/1995 | Greuter et al. | 338/22 R |
| 5,416,462 | 5/1995 | Demarmels et al. | 338/22 R |
| 5,432,140 | 7/1995 | Sumpter et al. | |
| 5,436,274 | 7/1995 | Sumpter et al. | |
| 5,451,919 | 9/1995 | Chu et al. | 338/22 R |

FOREIGN PATENT DOCUMENTS

| | | |
|---|---|---|
| 0487920 | 10/1991 | European Pat. Off. . |
| 0640995 | 8/1993 | European Pat. Off. . |
| 9112643 | 8/1991 | WIPO . |
| 9119297 | 12/1991 | WIPO . |

Primary Examiner—Teresa J. Walberg
Assistant Examiner—Karl Easthom
Attorney, Agent, or Firm—William H. Pittman

[57] ABSTRACT

A current limiting device utilizing an electrically conductive composite material and an inhomogeneous distribution of resistance structure is disclosed. The inhomogeneous distribution is typically chosen so that at least one selected thin layer of the current limiting device has much higher resistance than the rest of the current limiting device. In the actual device, pressure is typically exerted on the composite material in a direction normal to the selected thin layer. During a short-circuit, it is believed that adiabatic resistive heating of this selected thin layer is followed by rapid thermal expansion which leads to either a partial or complete physical separation of the current limiting device at the selected thin layer which produces a higher over-all device resistance to electric current flow. Thus the current limiting device limits the flow of current through the short-circuited current path. When the short-circuit is cleared, the current limiting device regains its low resistance state allowing electrical current to flow normally. The current limiting of the present invention is reusable for many such short circuit conditions.

41 Claims, 5 Drawing Sheets

CURRENT LIMITING DEVICE

This invention was made with government support under Contract No. N61533-94-C-0018 awarded by the U.S. Navy.

BACKGROUND OF THE INVENTION

This invention relates generally to devices for general circuit protection including electrical distribution and motor control applications, more particularly to simple, reusable, potentially low cost devices that can be tailored to a plurality of applications and most particularly to current limiting devices for relatively high power applications where the system voltage is equal to or greater than 100 V and the short-circuit current is equal to or greater than 100A utilizing an electrically conductive composite material and an inhomogeneous distribution of resistance structure.

There are numerous devices that are capable of limiting the current in a circuit when a short-circuit occurs. One current limiting device presently being used includes a filled polymer material which exhibits what is commonly referred to as a PTCR (positive-temperature coefficient of resistance) or PTC effect. The unique attribute of the PTCR or PTC effect is that at a certain switch temperature the PTCR material undergoes a transformation from a more conducting material to a more resistive material. In some of these prior current limiting devices, the PTCR material (typically polyethylene loaded with carbon black) is placed between pressure contact electrodes.

In operation, these prior current limiting devices are placed in the circuit to be protected. Under normal circuit conditions, the current limiting device is in a highly conducting state. When a short-circuit occurs, the PTCR material heats up through resistive heating until the temperature is above the switch temperature. At this point, the PTCR material resistance changes to a high resistance state and the short-circuit current is limited. When the short-circuit is cleared, the current limiting device cools down to below the switch temperature and returns to the highly conducting state. In the highly conducting state, the current limiting device is again capable of switching to the high resistance state in response to future short-circuit events.

U.S. Pat. No. 5,382,938 describes a PTC element comprising a body of an electrically conductive polymer composition having a resistivity with a positive temperature coefficient, the body defining two parallel end surfaces and two electrodes arranged in contact with the end surfaces for carrying current through the body. The polymer composition of the body includes a polymer material and an electrically conductive powdered material distributed in the polymer material. The expression PTC element is the accepted term for an element which exhibits a positive temperature coefficient of resistance with a switch temperature as shown in FIG. 1 of U.S. Pat. No. 5,382,938. At least one of the parallel surfaces on the body is in free contact with an electrode or with a parallel surface on another body of electrically conductive polymer composition. A pressure device inserts a pressure directed perpendicularly to the parallel surfaces on the body, or the bodies, on the electrodes. The pressure device is preferably provided with a pressure-exerting devices with the ability to be resilient. After changing from a low resistance to a high resistance state, the PTC element returns to the initial resistance and is reusable after having been subjected to short-circuit currents. The parallel surfaces on the body, or the bodies, of polymer composition may be concentric. PTC elements are used in electric circuits as overcurrent protection.

U.S. Pat. No. 5,313,184 describes an electric resistor having a resistor body arranged between two contact terminals. The resistor core includes an element with PTC behavior, which, below a material-specific temperature, forms an electrically conducting path running between the two contact terminals. The resistor can be simple and inexpensive, but still having high rate current-carrying capacity protected against local and overall overvoltages. This is achieved by the resistor core additionally containing a material having varistor behavior. The varistor material is connected in parallel with at least one subsection of the electrically conducting path, forming at least one varistor, and is brought into intimate electrical contact with the part of the PTC material forming the at least one subsection. The parallel connection of the element with PTC behavior and the varistor can be realized both by a microscopic construction and by a macroscopic arrangement.

European Patent 0,640,995 A1 describes an electrical resistance element containing a resistive material that has PTC characteristics and is arranged between two plane-parallel electrodes that are subjected to pressure, whereby the resistive material consists of a polymer matrix and two filler components that consist of electrically conducting particles, wherein the two filler components are embedded in the polymer matrix. In the event of a short-circuit current, the resistivity of the resistive material changes, in a step-like manner above a limiting temperature value, in a surface layer that lies on the electrodes and that contain at least the first of the two filler components. The second of the two filler components is selected in such a way that a composite material that contains at least a polymer matrix and the second filler component exhibits PTC characteristics with a step characteristic that is higher by at least one order of magnitude, relative to the surface layer. At the same time, this composite material has a resistivity that is lower, by at least one order of magnitude, than a composite material that is formed from the polymer matrix and the first filler component.

Despite the efforts described above, all of which involve PTC behavior, to provide a simpler, more durable current limiting devices, a need still exists for more even simpler and more durable, reusable potentially low cost current limiting devices for general circuit protection in electrical distribution and motor control applications that can be tailored to a plurality of applications. Such devices should protect the circuits for at least more than for one short circuit and preferably many short circuits, not require that the material exhibit PTCR effect and be usable with high voltages of 100 to 500 volts or more.

SUMMARY OF THE INVENTION

Current limiting devices are used in many applications to protect sensitive components in an electrical circuit from high fault currents. Applications range from low voltage/current electrical circuits to high voltage/current electrical distribution systems. The present invention provides a simple, reusable, potentially low cost current limiting device that can be tailored to a plurality of applications.

One embodiment of the present invention includes a current limiting device comprising: an electrically conducting composite material having no PTC effect and including an electrically conductive filler; at least two electrodes operatively positioned relative to the composite material; an inhomogeneous distribution of resistance operatively positioned between the outer electrodes; and means for exerting compressive pressure on the electrically conductive composite material.

It is accordingly an object of the present invention to provide a current limiter comprising a material that does not exhibit any PTC effect.

Other objects and advantages of the invention will be apparent from the following description, the accompanying drawings and the appended claims.

DETAILED DESCRIPTION OF THE INVENTION

Figure 1:
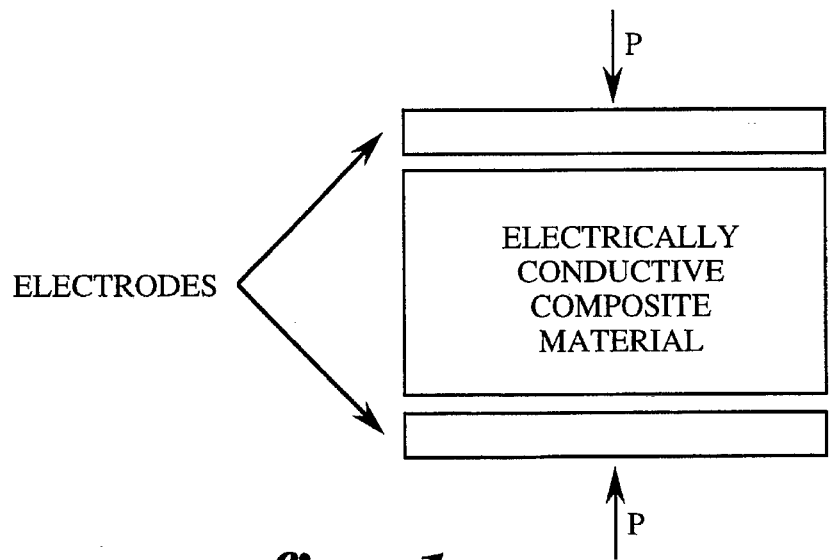
FIG. 1 is a diagrammatic representation of a current limiting device in accordance with the present invention.

The present invention as shown in FIG. 1 comprises a current limiting device 1 comprising electrodes 3a utilizing a composite material 5 comprising a low pyrolysis or vaporization temperature binder and an electrically conducting filler combined with inhomogeneous distributions 7 of resistance structure and under compressive pressure P. The binder should be chosen such that significant gas evolution occurs at low (<800° C.) temperature. The inhomogeneous distribution structure is typically chosen so that at least one selected thin layer of the current limiting device has much higher resistance than the rest of the current limiting device.

While not wishing to be bound by theory, it is believed that the advantageous results of the invention are obtained because, during a short-circuit, adiabatic resistive heating of this selected thin layer followed by rapid thermal expansion and gas evolution from the binding material leads to a partial or complete physical separation of the current limiting device at the selected thin layer which produces a higher over-all device resistance to electric current flow. Thus the current limiting device limits the flow of current through the short-circuited current path. When the short-circuit is cleared, by external means, it is believed that the current limiting device regains its low resistance state due to the compressive pressure built into the current limiting device allowing thereby electrical current to flow normally. The current limiting of the present invention is reusable for many such short circuit conditions, depending upon such factors, among others, as the severity and duration of each short circuit.

The invention will be further clarified by a consideration of the examples which follow, which are intended to be purely exemplary of the use of the invention In accordance with one example of the present invention, a current limiting device is constructed using an electrically conductive composite material so that there is an inhomogeneous distribution of resistance throughout the device. For this device to work properly as a reusable current limiting device, the inhomogeneous resistance distribution should be arranged so that at least one thin layer of the current limiting device is positioned perpendicular to the direction of current flow and has a much higher resistance than the average resistance for an average layer of the same size and orientation in the device. In addition, the current limiting device must be under compressive pressure in a direction perpendicular to the selected thin high resistance layer.

One example of a current limiting device, in accordance with the present invention, comprises a highly conducting composite material with low pyrolysis temperature binder and conducting filler that is pressure contacted to electrodes so that there is a significant contact resistance between the material and one or both electrodes. In operation, the device is placed in series with the electrical circuit to be protected. During normal operation, the resistance of the limiting device is low (in this example the resistance of the current limiting device would be equal to the resistance of the highly conducting composite material plus the resistance of the electrodes plus the contact resistance). When a short-circuit occurs, a high current density starts to flow through the device. In the initial stages of the shod-circuit, the resistive heating of the device is believed to be adiabatic. Thus, it is believed that the selected thin, more resistive layer of the current limiting device heats up much faster than the rest of the current limiting device. With a properly designed thin layer, it is believed that the thin layer heats up so quickly that thermal expansion of and/or gas evolution from the thin layer cause a separation within the current limiting device at the thin layer.

In a representative current limiting device, it is believed that the vaporization and/or ablation of the composite material causes the electrode to separate from the material. In this separated state, it is believed that ablation of the composite material occurs and arcing between the separated layers of the current limiting device can occur. However, the overall resistance in the separated state is much higher than in the nonseparated state. This high arc resistance is believed due to the high pressure generated at the interface by the gas evolution from the composite binder combined with the deionizing properties of the gas. In any event, the current limiting device of the present invention is effective in limiting the shod-circuited current so that the other components of the circuit are not harmed by the short circuit.

After the short-circuited current is interrupted, it is believed that the current limiting device, of the present invention, when properly designed, returns or reforms into its nonseparated state due to compressive pressure which acts to push the separated layers together. It is believed that once the layers of the current limiting device have returned to the nonseparated state or the low resistance state, the current limiting device is fully operational for future current-limiting operations in response to other short-circuit conductors.

Alternate embodiments of the current limiting device of the present invention can be made by employing a parallel current path containing a resistor, varistor, or other linear or nonlinear elements to achieve goals such as controlling the maximum voltage that may appear across the current limiting device in a particular circuit or to provide an alternative path for some of the circuit energy in order to increase the usable lifetime of the current limiting device.

EXAMPLE 1

In order to demonstrate the effectiveness of the present invention, a current limiting device was constructed, as shown in FIG. 1. The electrically conductive composite material comprised an elastomer, specifically silicone, as the binder material and a metal, specifically silver, as the filler material and had a resistivity of about 0.004 ohm-cm. The silver-filled curable silicone material (elastomer) was made by mixing two parts, A & B. The A part comprised a vinyl silicone organopolysiloxane fluid having terminal dimethylvinylsiloxy units and dimethylsiloxy units with a viscosity of 400 cps at 25° C. (23 g), the following silver particles from Ames Goldsmith Corp. Ag 4300 (46.6 g), Ag 1036 (37.3 g) and Ag 1024 (37.3 g), and a silicone hydride siloxane fluid having terminal trimethyl siloxy units to provide a fluid with about 0.8% by weight chemically combined hydrogen attached to silicon (1 g). The B part comprised the vinyl silicone organopolysiloxane fluid having terminal dimethylvinylsiloxy units and dimethylsiloxy units with a viscosity of 400 cps (2 g), dimethyl maleate (14 μL) and Karstedt's platinum catalyst (83 μL of a 5% platinum solution in xylene) [for details see U.S. Pat. No. 3,775,452, B. D. Karstedt (1973)]. The A component (40 g) and B component (0.44 g) were mixed and then poured into a mold and then cured in a Carver press at 150° C., 30 minutes at 5000 pounds pressure.

The electrodes were made up of copper electroplated with nickel and were pressure contacted to the composite material. It should be noted that neither the electrically conductive composite material nor the electrode material exhibit any PTCR switching effect. The electrodes were about ¼ inch in diameter and were centered on the material which had about a ¾ inch diameter and a thickness dimension of about ⅛ inch. Pressure was applied by placing a force of about 3.7 kg across the electrodes which resulted in a pressure of about 170 PSI. The example current limiting device acted as a simple resistor with a resistance of about 0.06 ohm when less than about 30A of current was applied through the device.

Figure 2:
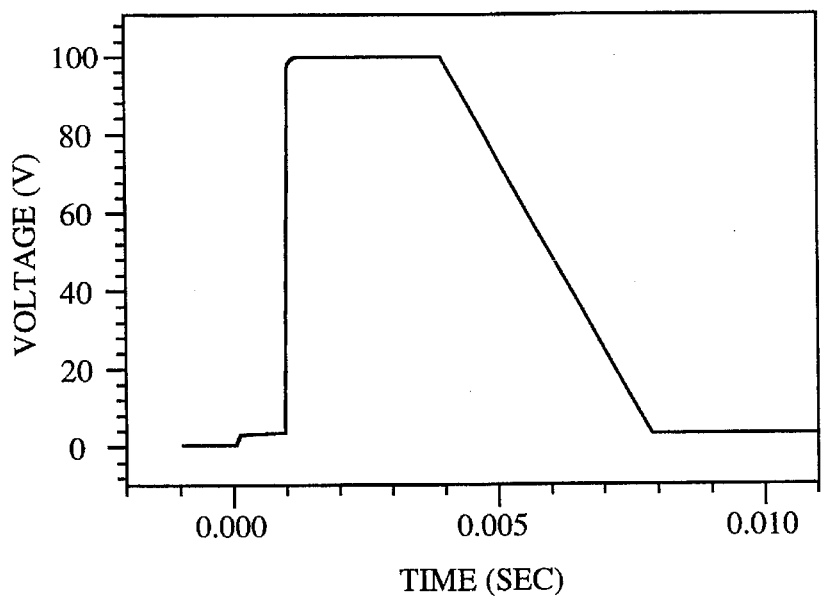
FIG. 2 is a graphic representation illustrating a voltage pulse utilized to simulate a short-circuit condition.

FIG. 2 shows a voltage pulse utilized to simulate a short-circuit condition. For about the first millisecond, the voltage is about 2.5 V simulating normal circuit operation. The voltage then jumps to about 100 V for about 3 milliseconds simulating a short-circuit condition. The voltage is then reduced back to about 2.5 V in about 4 milliseconds simulating the correction of the short-circuit.

Figure 3:
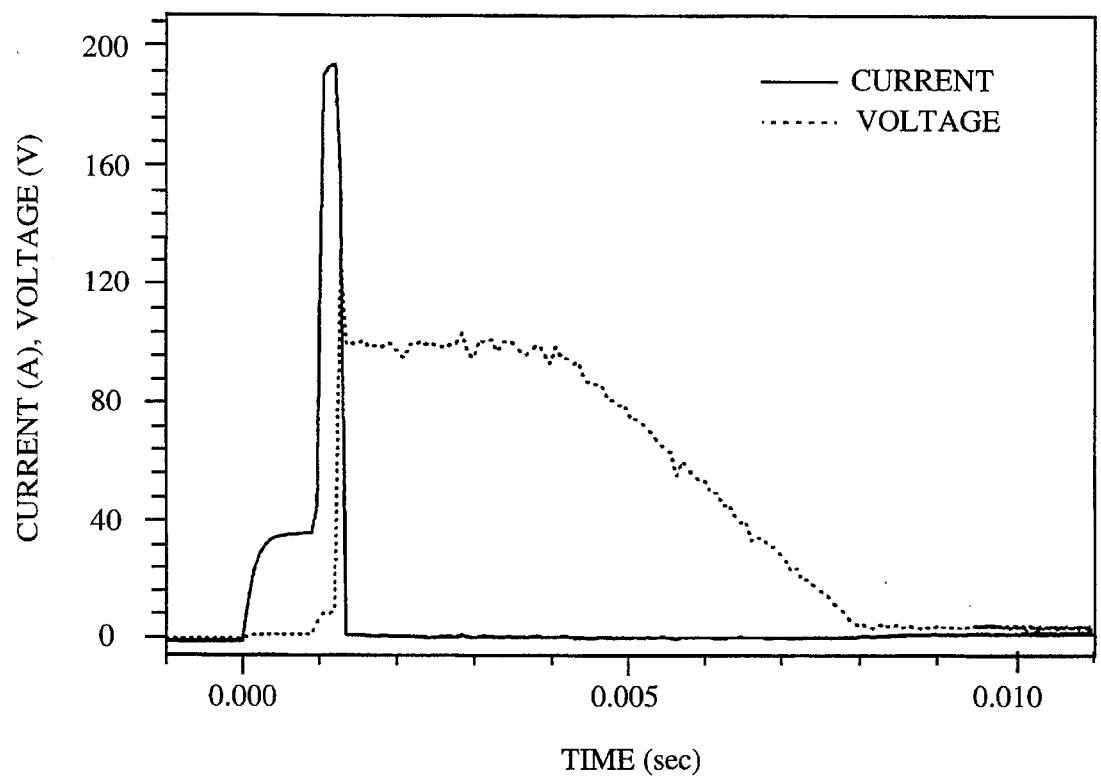
FIG. 3 is a graph illustrating the current through a representative current limiting device of the present invention and the voltage across the current limiting device when the voltage pulse, as shown in FIG. 2, is applied to the current limiting device of FIG. 1.

FIG. 3 illustrates the current through the current limiting device and voltage across it when the voltage pulse, shown in FIG. 2, is applied to the current limiting device.

Figure 4:
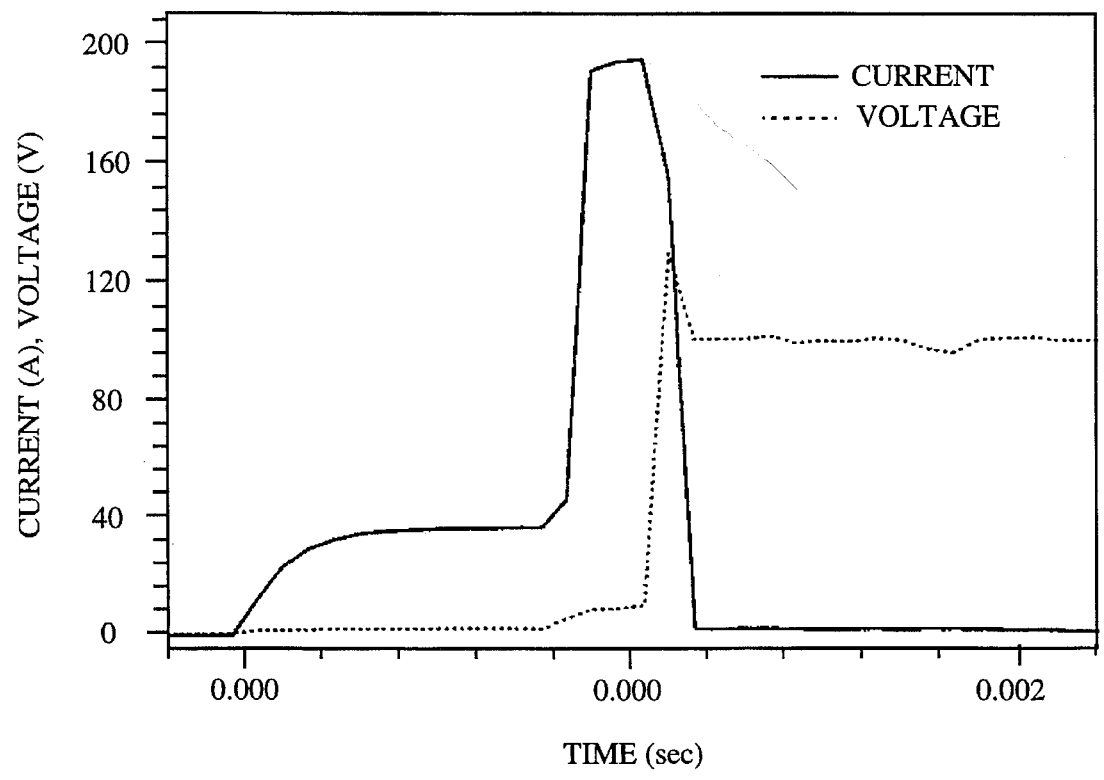
FIG. 4 is a graph illustrating an early portion of the simulated short-circuit device.

FIG. 4 illustrates a close-up of the early portion of the simulated short-circuit. It should be noted that when the voltage climbs to about 100 V, the current climbs to about 190A and then suddenly drops to a low value of about 1A, then stays at that low value for the duration of the pulse. Thus, the current has been limited from a prospective value of about 1,667A (100 V/0.06 ohm) to a value of less than 1A.

Figure 5:
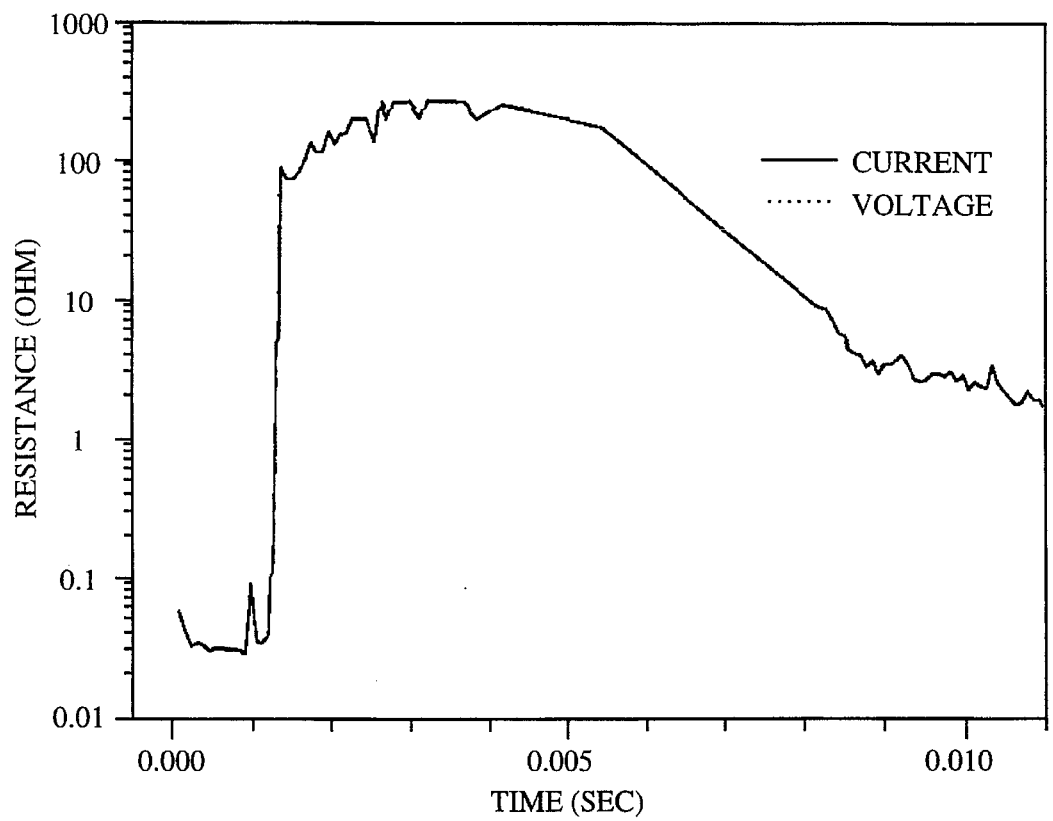
FIG. 5 is a graph illustrating the resistance of the current limiting device of FIG. 1 as a function of time.

FIG. 5 illustrates the resistance of the current limiting device as a function of time. Note that the resistance switches by a factor of greater than 3,000 when the about 100 V pulse hits the sample current limiting device. After the completion of this pulse test, the current limiting device resistance returned to its initial value of about 0.06A (measured using a 30A current probe). The current limiting device was thus ready for further current limiting operations. In fact, the current limiting device was put through three more current-limiting operations without any type of failure and, based upon the low level of damage to both the material and the electrodes, there appears to be no reason to believe that the current limiting device could not have worked many more times.

EXAMPLE 2

Another example of current limiting, according to the present invention, using a preferred electrically conductive composite material are shown in FIGS. 6–9. This example utilizes the current limiter device structure shown in FIG. 1 with a composite material comprising a thermoset binder, specifically an epoxy binder (Epoxy-Technology Inc. N30 material) and a metal, specifically nickel powder, as the conducting filler material. This material has a resistivity of about 0.02–0.03 ohm-cm and does not exhibit a PTCR effect. Physically, the devices used in these examples had nickel-electroplated copper electrodes that were about ¼ inch in diameter and were centered on the material which had a ¾ inch diameter and a thickness of about ⅛ inch. Pressure was applied by placing a force of about 8.2 kg across the electrodes resulting in a pressure of about 370 PSI. The sample current limiting device acted as a simple resistor with a resistance of about 0.1 ohm when less than 30A of current was applied through the current limiting device.

Figure 6:
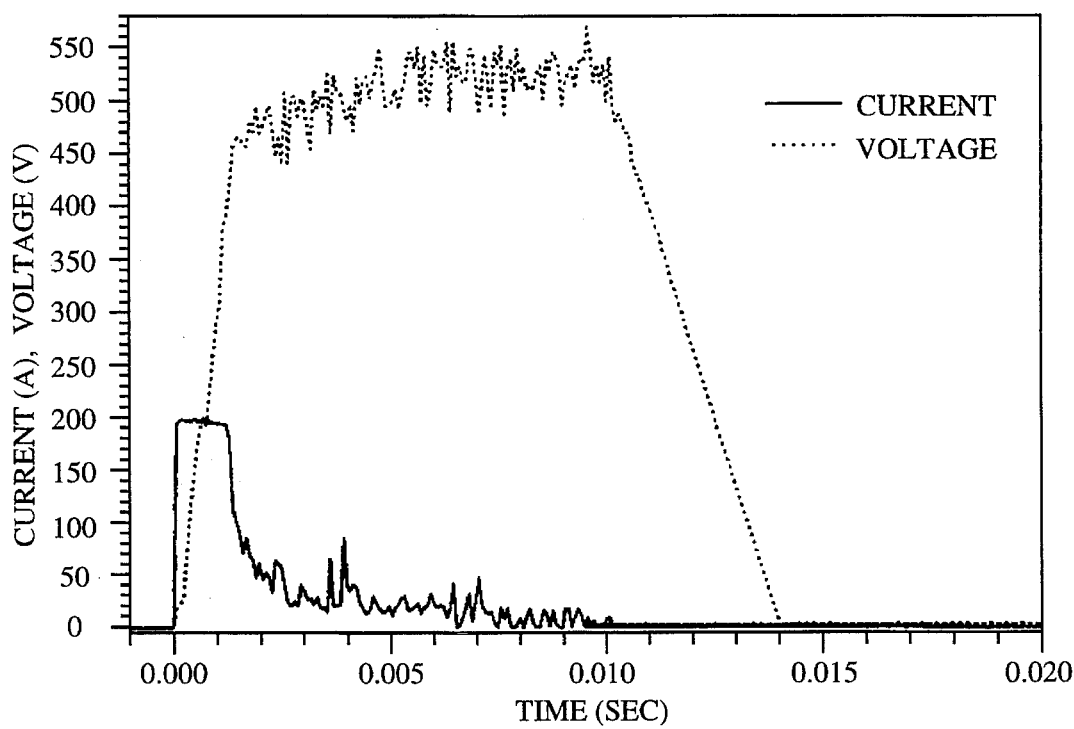
FIG. 6 is a graph illustrating the current through and the voltage across the current limiting device of FIG. 1 made using a nickel filled epoxy material as the electrically conductive composite material when a voltage pulse of approximately 500 volts, to simulate short-circuit conditions, is applied across the current limiting device of FIG. 1.

FIG. 6 illustrates the current through and the voltage across the device when a voltage pulse of approximately 500 V intended to simulate short-circuit conditions was applied across the device. At the onset of the applied voltage pulse at 0 sec, the current rises to about 200A and then maintains that value for about 1.2 milliseconds. This initial current value of about 200A is limited by the output capability of the voltage pulsing apparatus used in this test. Due to this instrumental limitation, the voltage does not reach 500 V during this initial 1.2 milliseconds. However, during this initial 1.2 milliseconds the voltage across the device rises as the device transitions into its high resistance state. After 1.2 milliseconds, the current has been forced down to values below about 50A by the action of the current limiter as the current limiter reaches its high resistance state and the full 500 V is measured across the current limiter device. The current remained at a level below about 50A until the voltage across the device was terminated at 14 milliseconds.

Figure 7:
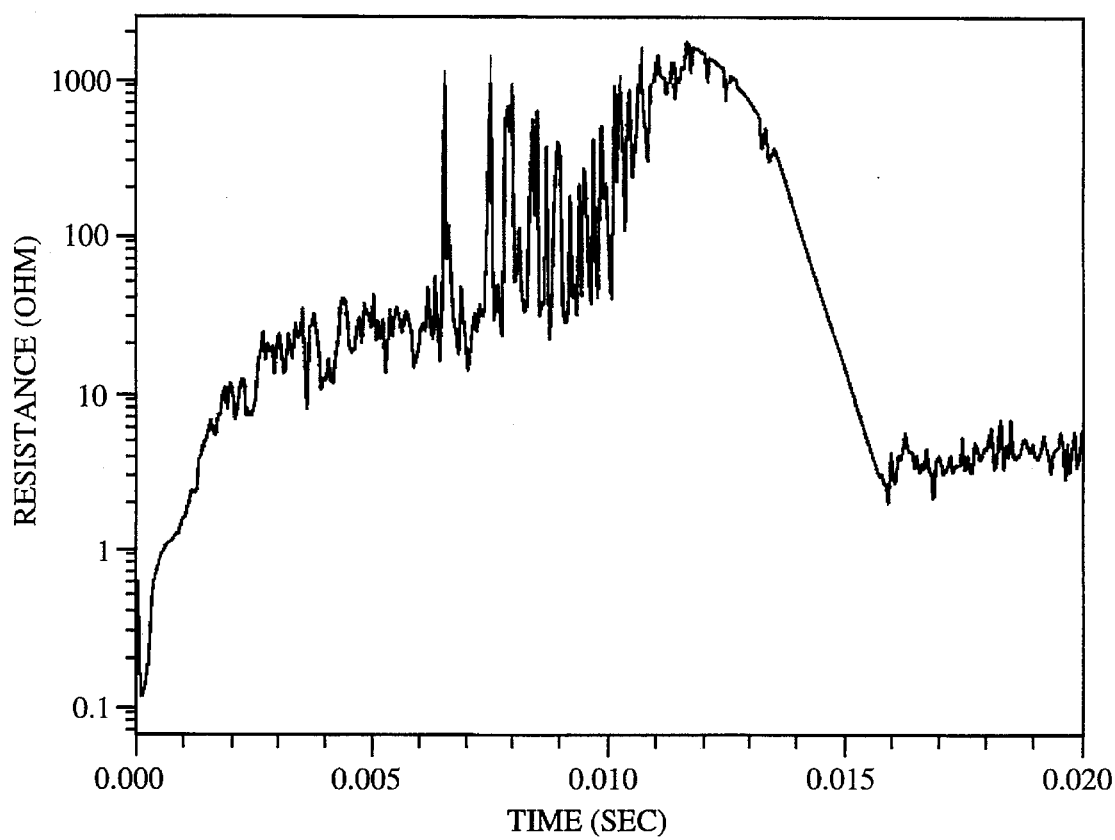
FIG. 7 is a graph illustrating the resistance of the current limiting device of FIG. 1 obtained from the data in FIG. 6 by dividing the voltage waveform by the current waveform.

FIG. 7 illustrates the resistance of the current limiter device obtained from the data obtained from FIG. 6 by dividing the voltage waveform by the current waveform. Note that at the beginning of the voltage pulse the resistance was about 0.1 ohm and that the resistance rises to values greater than about 10 ohm after about 1.2 milliseconds and maintained this high resistance state until the voltage pulse terminated at 14 milliseconds. After this demonstration of current limiting, it was verified that the current limiting device regained its initial low resistance value of 0.1A under low current (<30A) conditions. This test sequence was repeated successfully with the same device for a total of three operations with 500 V short-circuit simulation voltage pulses in order to prove that this current limiting device could perform as a reusable current limiter.

The examples depicted in FIGS. 3–7 demonstrate that the current limiting device of this invention can effectively limit the current during a short circuit in a direct current (DC) circuit without the use of material having the PTCR effect.

Figure 8:
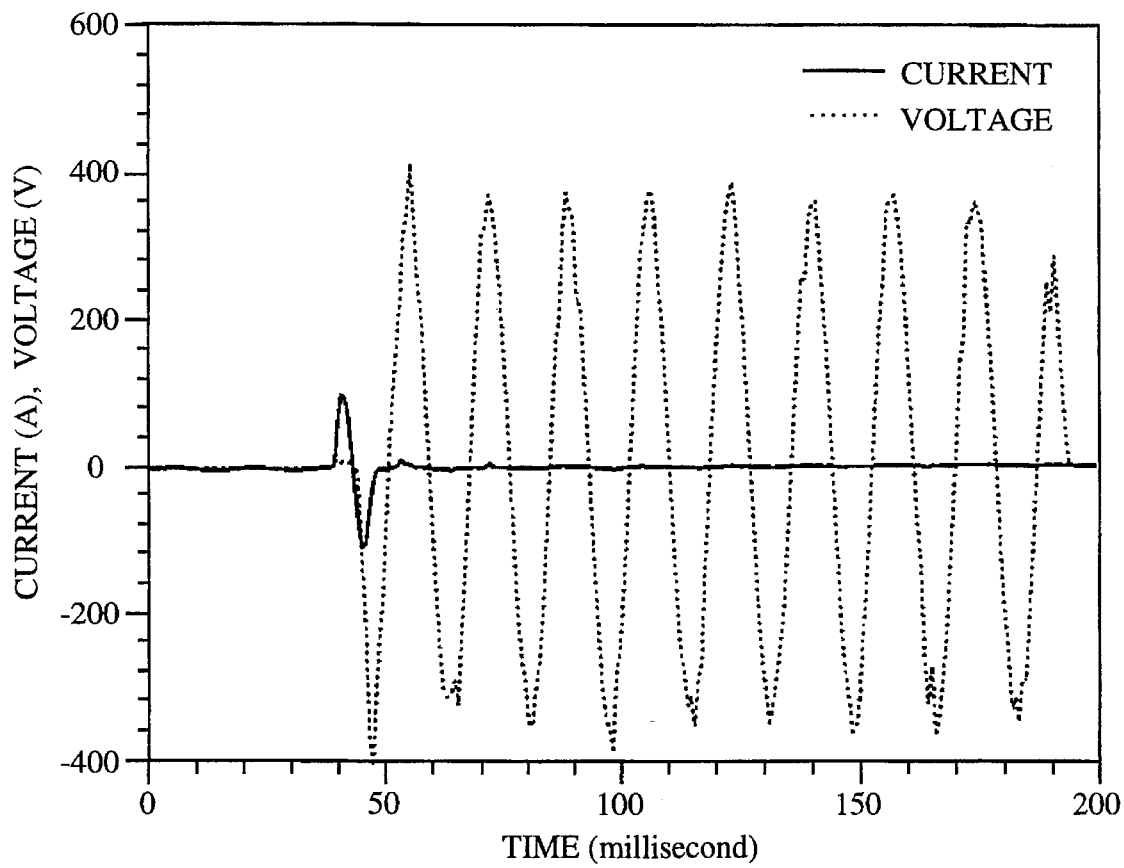
FIG. 8 is a graph illustrating the current and voltage waveform from a 60 Hz AC voltage pulse with about 370 V amplitude and 150 millisecond time duration applied to the current limiting device of FIG. 1.

FIG. 8 illustrates that the current limiting device of the present invention can also be used as a reusable current-limiter for alternating current (AC) circuits. The current limiting device used in the experiment illustrated by FIG. 8 was identical in material and construction to the device used in the previous example for direct current (DC) circuits. The initial resistance of the current limiting device, probed with a low current (<30A) pulse, was about 0.1 ohm.

FIG. 8 illustrates the current and voltage waveform when about a 60 Hz AC voltage pulse with about 370 V amplitude and about 150 milliseconds time duration was applied to the current limiting device. The AC pulse was applied with a closing phase angle of approximately 120 degrees for approximately 40 milliseconds. Note that the current increased to a value of approximately +100A, then decreased and crossed 0A as the voltage crossed 0 V and then increased in magnitude to a value of approximately −100A. The current magnitude was then forced down to a level of less than about 2A by the action of the current limiting device even as the voltage magnitude continued to rise. The current magnitude then remained at a level of less than about 2A as the AC voltage continued to oscillate between +370 and −370 V for approximately 195 milliseconds when the AC voltage pulse was terminated. Thus, the current limiting device attained a high resistance state with a greater than 185 ohm resistance value.

After this demonstration of current limiting, it was verified that the current limiting device regained its initial low resistance value of about 0.1A under low current (<30A) conditions. This test sequence was repeated successfully a second time with the same 370 V AC voltage pulse in order to prove that this device could perform as a reusable current limiter.

It should be apparent to those skilled in the art that the current limiting device of the present invention works more than once (as opposed to a fuse); is triggered by heating at the interface due to contact resistance; requires a low pyrolysis/decomposition/ablation temperature binder (<800° C.) such as organic binder with electrically conducting filler; is combined with metal and/or semiconductor electrodes under pressure; does not require that the material exhibit PTCR effect; limits AC and DC voltage/current waveforms; has been tested to voltages up to 500 V (presently unclear what upper limit may be); and has electrodes which can be integrally attached or simply pressure contacted to the material.

The following examples represent experiments actually conducted. These examples utilizing various binder materials, conducting filler materials, third phase filler materials, if appropriate, and electrode materials were all successful in that the simulated short circuit current was limited in the same manner as described above. The following experiments were all conducted utilizing the basic current limiter configuration of FIG. 1; however, it should be noted that the present invention is not limited to the single composite material, two electrode version shown in FIG. 1 but could include multiple composite material and more than two electrodes.

EXAMPLE 3

A thermoset binder, specifically, an epoxy binder with a metal filler, specifically silver, as the conducting filler was prepared using the following silver particles from Ames Goldsmith Corp. Ag 4300 (5.6 g), Ag 1036 (4.2 g), Ag 1024 (4.2 g) and a two component commercial epoxy (Epotek 301) obtained from Epoxy Technology Inc. The epoxy resin (2.3 g) was mixed with the hardener (0.6 g) and then the silver particles were added and the mixture was placed in a Teflon® mold and cured at 60 C. for 1 hour. The electrodes were made of Ni-coated Cu.

EXAMPLE 4

A thermoset binder, specifically an epoxy binder with a metal, specifically Silver, as the conducting filler was prepared using Ablebond® 967-1 (Commercial Conducting Adhesive Material from Ablestik Electronic Materials & Adhesives (a subsidiary of National Starch and Chemical Company) was placed in a Teflon® mold and cured at 80 C. for about 2 hours. The electrodes were made of Ni-coated Cu.

EXAMPLE 5

A thermoset binder, specifically an epoxy binder with a metal, specifically Nickel, as the conducting filler was prepared using Epotek N30 (Commercial Conducting Adhesive Material from Epoxy Technology Inc.) was placed in a Teflon® mold and cured at 150 C. for about 1 hour. With this specific electrically conductive composite material, separate current limiting devices having the electrodes made of Ni-coated Cu, Stainless Steel, Ag-coated Cu and Cu were tested.

EXAMPLE 6

An elastomer binder, specifically a Silicone binder with a two component metal conducting filler, specifically Silver+Aluminum, as the conducting filler was prepared by mixing two parts, A & B. The A part comprised a vinyl silicone organopolysiloxane fluid having terminal dimethylvinylsiloxy units and dimethylsiloxy units (400 cps, 23 g), 37.3 g of aluminum powder, the following silver particles from Ames Goldsmith Corp. Ag 4300 (46.6 g), Ag 1036 (37.3 g) and Ag 1024 (37.3 g), and a silicone hydride siloxane fluid having terminal trimethyl siloxy units to provide a fluid with about 0.8% by weight chemically combined hydrogen attached to silicon (1 g). The B part comprised vinyl silicone organopolysiloxane fluid having terminal dimethylvinylsiloxy units and dimethylsiloxy units with a viscosity of 400 cps (2 g), dimethyl maleate (14 μL) and Karstedt's platinum catalyst, mentioned above (83 μL of a 5% platinum solution in xylene). The A component (40 g) and B component (0.44 g) were mixed and then poured into a mold and then cured in a Carver press at about 150° C. for about 30 minutes at about 5000 pounds pressure. In this example, the electrodes were made of either Ni-coated Cu or an n-type Si (semiconductor).

EXAMPLE 7

An elastomer binder, specifically a Silicone binder, with a metal conducting filler, specifically Silver only, as the conducting filler was prepared by mixing two parts, A & B. The A part comprised a vinyl silicone organopolysiloxane fluid having terminal dimethylvinylsiloxy units and dimethylsiloxy units (400 cps, 23 g), the following silver particles from Ames Goldsmith Corp. Ag 4300 (46.6 g), Ag 1036 (37.3 g) and Ag 1024 (37.3 g), and a silicone hydride siloxane fluid having terminal trimethyl siloxy units to provide a fluid with about 0.8% by weight chemically combined hydrogen attached to silicon (1 g). The B part was comprised the vinyl silicone organopolysiloxane fluid having terminal dimethylvinylsiloxy units and dimethylsiloxy units with a viscosity of 400 cps (2 g), dimethyl maleate (14 μL) and Karstedt's platinum catalyst, as mentioned above (83 μL of a 5% platinum solution in xylene). The A component (40 g) and B component (0.44 g) were mixed and then poured into a mold and then cured in a Carver press at 150° C., 30 minutes at 5000 pounds pressure. In this example, the electrodes were made of Ni-coated Cu.

EXAMPLE 8

An elastomer binder, specifically a silver-filled, curable silicone was made from two parts, A & B. The A part comprised a vinyl silicone organopolysiloxane fluid having terminal dimethylvinylsiloxy units and dimethylsiloxy units (400 cps, 33 g), the following silver particles from Ames Goldsmith Corp. Ag 4300 (46.6 g), Ag 1036 (37.3 g) and Ag 1024 (37.3 g), alpha quartz (Minusil, 23 g) and a silicone hydride siloxane fluid having terminal trimethyl siloxy units to provide a fluid with about 0.8% by weight chemically combined hydrogen attached to silicon (2 g). The B part comprised the vinyl silicone organopolysiloxane fluid having terminal dimethylvinylsiloxy units and dimethylsiloxy units with a viscosity of 400 cps (10 g), dimethyl maleate (70 μL) and Karstedt's platinum catalyst, as mentioned above (415 μL of a 5% platinum solution in xylene). The A component (40 g) and B component (0.5 g) were mixed and then poured into a mold and then cured in a Carver press at about 150° C. for about 30 minutes at about 5000 pounds pressure. In this example, the electrodes were made of Ni-coated Cu.

EXAMPLE 9

A reinforced elastomer binder, specifically a curable silicone reinforced with fumed silica, with a two component metal filler, specifically, silver and aluminum was made with an A part and a B part. The A part was composed of an elastomer binder, specifically a vinyl silicone organopolysiloxane fluid having terminal dimethylvinylsiloxy units and dimethylsiloxy units (400 cps, 23 g), a silicone hydride siloxane fluid having terminal trimethyl siloxy units to provide a fluid with about 0.8% by weight chemically combined hydrogen attached to silicon (2 g), doubly treated fumed silica (300 m$^2$/g, treated with cyclooctamethyltetrasiloxane and with hexamethyldisilazane, 1.2 g),aluminum powder (37.3 g), silver particles from Ames Goldsmith Corp. Ag 4300 (46.6 g), Ag 1036 (37.3 g), Ag 1024 (37.3 g). The B part was composed of the vinyl silicone organopolysiloxane fluid having terminal dimethylvinylsiloxy units and dimethylsiloxy units (400 cps, 2 g), dimethylmaleate (14 μL) and Karstedt's platinum catalyst (83 μL). A curable formulation was prepared by combining the A part (40 g) and the B part (0.44 g) and then hand mixing and placing in a mold. Cure was accomplished in a Carver press at 5000 pounds pressure and 150° C. for 30 min. In this example, the electrodes were made of Ni-coated Cu.

EXAMPLE 10

An elastomer binder, specifically a nickel filled silicone, was made from two parts, A & B. The A part consisted of a vinyl silicone organopolysiloxane fluid having terminal dimethylvinylsiloxy units and dimethylsiloxy units (400 cps, 25 g), nickel powder (INCO type 123, 100 g) and a silicone hydride siloxane fluid having terminal trimethyl siloxy units to provide a fluid with about 0.8% by weight chemically combined hydrogen attached to silicon (2 g). The B part was composed of the vinyl silicone organopolysiloxane fluid having terminal dimethylvinylsiloxy units and dimethylsiloxy units with a viscosity of 400 cps (10 g), dimethyl maleate (70 μL) and Karstedt's platinum catalyst (415 μL of a 5% platinum solution in xylene). The A component (40 g) and B component (0.5 g) were mixed and then poured into a mold and then cured in a Carver press at 150° C., 30 minutes at 5000 pounds pressure. In this example, the electrodes were made of Ni-coated Cu.

EXAMPLE 11

A thermoplastic binder, specifically polytetrafluoroethylene binder, with a semiconductor conducting filler, specifically Carbon Black was commercially obtained. Specifically, GS-2100-080-5000-SC (Commercial Conductive Fluoropolymer from W. L. Gore & Associates, Inc.) was utilized with electrodes made of Ni-coated Cu.

EXAMPLE 12

Finally, a thermoplastic binder, specifically Poly(ethylene glycol) with a metal filler, specifically Silver, as the conducting filler was made. A silver particle mixture comprising the following particles from Ames Goldsmith Corp., Ag 4300 (2.8 g), Ag 1036 (2.1 g), Ag 1024 (2.1 g) was heated to about 80 C. and then poured into molten Poly(ethyleneglycol) (MW8000) at about 80° C. and mixed. The material was then poured into a Teflon® mold and allowed to harden at room temperature. In this example, the electrodes were made of Ni-coated Cu.

For the above exemplary examples, when tested as a current limiter, the electrodes were pressed against the electrically conductive composite material at pressures ranging from about six (6) to about three hundred seventy (370) PSi. Specifically, the pressure used in examples 3, 4, 6, 7 and 11 was about 170 PSI; examples 5, 8 and 10 was about 370 PSI; and examples 9 and 12 was about 6 PSI. While the above pressure range was actually tested, it may be possible that the device of the present invention will perform properly at higher or lower pressures.

From the above, it is clear that a binder material having a low pyrolysis or vaporization temperature (<800° C.) such as: a thermoplastic (for example, polytetrafluoroethylene, poly(ethyleneglycol), polyethylene, polycarbonate, polyimide, polyamide, polymethylmethacrylate, polyester etc.); a thermoset plastic (for example, epoxy, polyester, polyurethane, phenolic, alkyd); an elastomer (for example, silicone (polyorganosiloxane), (poly)urethane, isoprene rubber, neoprene, etc.); an organic or inorganic crystal; combined with an electrically conducting filler such as a metal (for example, nickel, silver, copper, etc.) or a semiconductor (for example, carbon black, titanium dioxide, etc.) with a particulate or foam structure; combined with a metal or semiconductor electrode pressure contacted to the electrically conducting composite material, could also perform effectively in the current limiter of the present invention.

Third phase fillers could be used to improve specific properties of the composite such as the mechanical properties; dielectric properties; or to provide arc-quenching properties or flame-retardant properties. Materials which could be used as a third phase filler in the composite material include: a filler selected from reinforcing fillers such as fumed silica, or extending fillers such as precipitated silica and mixtures thereof. Other fillers include titanium dioxide, lithopone, zinc oxide, diatomaceous silicate, silica aerogel, iron oxide, diatomaceous earth, calcium carbonate, silazane treated silicas, silicone treated silicas, glass fibers, magnesium oxide, chromic oxide, zirconium oxide, alpha-quartz, calcined clay, carbon, graphite, cork, cotton sodium bicarbonate, boric acid, alumina-hydrate, etc. Other additives may include: impact modifiers for preventing damage to the current limiter such as cracking upon sudden impact; flame retardant for preventing flame formation and/or inhibiting flame formation in the current limiter; dyes and colorants for providing specific color components in response to customer requirements; UV screens for preventing reduction in component physical properties due to exposure to sunlight or other forms of UV radiation.

Finally, the current limiter of the present invention could be utilized with parallel linear or nonlinear circuit element(s) such as resistor(s) or varistor(s).

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A current limiting device comprising:
   at least two electrodes;
   an electrically conducting composite material between said electrodes, said composite material comprising (A) a binder with a pyrolysis or vaporization temperature, at which significant gas evolution occurs, below 800° C., and (B) an electrically conductive filler;
   interfaces between said electrodes and said composite material;
   an inhomogeneous distribution of resistance at said interfaces whereby, during a short circuit, adiabatic resistive heating at said interfaces causes rapid thermal expansion and vaporization of said binder resulting in at least a partial physical separation at said interfaces; and
   means for exerting compressive pressure on said composite material.

2. The device of claim 1 wherein the composite material has no PTC effect.

3. The device of claim 1 wherein the resistance at said interface is at least about 10% higher than the average resistance of a layer of said composite material having the same size and orientation as said interface.

4. The device of claim 1 wherein said compressive pressure is applied perpendicular to said interfaces.

5. The device of claim 1 wherein said electrodes are pressure contacted to said composite material.

6. The device of claim 1 wherein, the electrically conducting composite material includes:
   a thermoplastic.

7. The device of claim 6 wherein, the thermoplastic comprises:
   polytetrafluoroethylene.

8. The device of claim 6 wherein, the thermoplastic comprises:
   poly(ethyleneglycol).

9. The device of claim 6 wherein, the thermoplastic comprises:
   polyethylene.

10. The device of claim 6 wherein, the thermoplastic comprises:
    polycarbonate.

11. The device of claim 6 wherein, the thermoplastic comprises:
    polyimide.

12. The device of claim 6 wherein, the thermoplastic comprises:
    polyamide.

13. The device of claim 6 wherein, the thermoplastic comprises:
    polymethylmethacrylate.

14. The device of claim 6 wherein, the thermoplastic comprises:
    polyester.

15. The device of claim 1 wherein, the electrically conducting composite material includes:
    a thermoset plastic.

16. The device of claim 15 wherein, the thermoset plastic comprises:
    epoxy.

17. The device of claim 15 wherein, the thermoset plastic comprises:
    polyester.

18. The device of claim 15 wherein, the thermoset comprises:
    polyurethane.

19. The device of claim 15 wherein, the thermoset comprises:
    phenolic containing resin.

20. The device of claim 15 wherein, the thermoset comprises:
    alkyd containing resin.

21. The device of claim 15 wherein, the thermoset comprises:
    an elastomer.

22. The device of claim 21 wherein, the elastomer comprises:
    silicone.

23. The device of claim 21 wherein the elastomer comprises:
    polyurethane.

24. The device of claim 21 wherein the elastomer comprises:
    isoprene rubber.

25. The device of claim 21 wherein the elastomer comprises:
    neoprene.

26. The device of claim 1 wherein, the electrically conducting material includes:
    a metal.

27. The device of claim 26 wherein, the metal comprises: nickel.

28. The device of claim 26 wherein, the metal comprises: silver.

29. The device of claim 26 wherein, the metal comprises: aluminum.

30. The device of claim 1 wherein, the electrically conducting composite material includes:
    a semiconductor.

31. The device of claim 30 wherein, the semiconductor comprises:
    carbon black.

32. The device of claim 30 wherein, the semiconductor comprises:
    titanium dioxide.

33. The device of claim 1 wherein, the electrically conducting composite material includes:

a silicone binder filled with silver.

34. The device of claim 1 wherein, the electrically conducting composite material includes:

a silicone binder filled with silver and aluminum.

35. The device of claim 1 wherein, the electrically conducting composite material includes:

a silicone binder filled with nickel.

36. The device of claim 1 wherein, the electrically conducting composite material includes:

an epoxy binder filled with nickel.

37. The device of claim 1 wherein, the electrically conducting composite material includes:

an epoxy binder filled with aluminum.

38. The device of claim 1 wherein, the electrically conducting composite material includes:

a polytetrafluoroethylene binder filled with carbon black.

39. The device of claim 1 wherein, the electrically conducting composite material includes:

a poly(ethyleneglycol) binder filled with silver.

40. The device of claim 1 wherein, the electrodes comprise a material selected from the group consisting of:

metals or semiconductors.

41. The device of claim 1 wherein, the compressive pressure means comprises:

spring means.

* * * * *

UNITED STATES PATENT AND TRADEMARK OFFICE
CERTIFICATE OF CORRECTION

PATENT NO. : 5,614,881

DATED : March 25, 1997

INVENTOR(S) : Anil R. Duggal et al.

It is certified that error appears in the above-identified patent and that said Letters Patent is hereby corrected as shown below:

Column 11, line 29, --polymeric-- should appear before "binder"; line 35, "at" should read --such that--; line 36, --have a much higher resistance than the average resistance for said device-- should follow "faces".

Signed and Sealed this

Twenty-second Day of December, 1998

Attest:

BRUCE LEHMAN

*Attesting Officer*          *Commissioner of Patents and Trademarks*